No. 678,163. Patented July 9, 1901.
S. COON.
NUT LOCK.
(Application filed May 18, 1901.)
(No Model.)
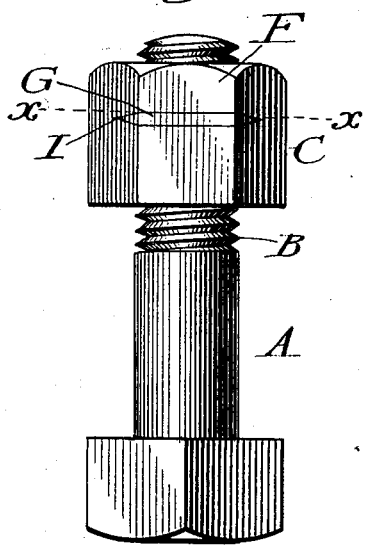
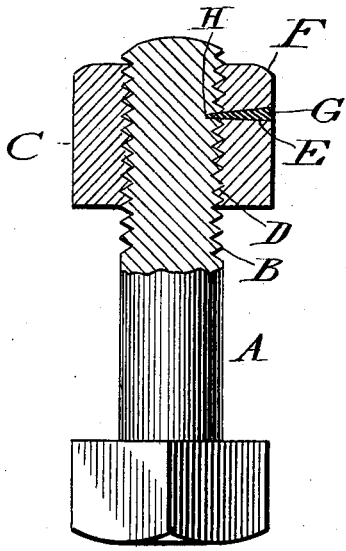
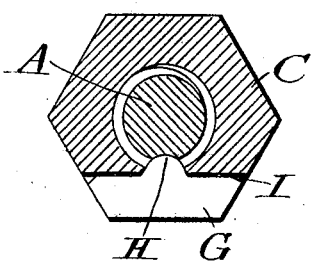
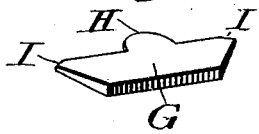
Witnesses.
D. W. Edelin
Chas. H. Baker.
Inventor.
Silas Coon.
By Stebbins & Wright
Attys.

UNITED STATES PATENT OFFICE.

SILAS COON, OF ASHLAND, KENTUCKY, ASSIGNOR OF ONE-FOURTH TO H. M. WARE, OF HUNTINGTON, WEST VIRGINIA.

NUT-LOCK.

SPECIFICATION forming part of Letters Patent No. 678,163, dated July 9, 1901.

Application filed May 18, 1901. Serial No. 60,927. (No model.)

*To all whom it may concern:*

Be it known that I, SILAS COON, a citizen of the United States, residing at Ashland, in the county of Boyd and State of Kentucky, have invented new and useful Improvements in Nut-Locks, of which the following is a specification.

The object of my invention is the provision of means for holding a nut in a fixed position upon a bolt, so it will not accidentally become loose by jarring or otherwise.

My invention consists in certain novelties of construction and combination of parts hereinafter set forth and claimed.

The accompanying drawings illustrate an example of the physical embodiment of my invention constructed according to the best mode I have so far devised for the application of the principle.

Figure 1 is a view in elevation of a bolt and nut having means for holding the nut in a locked position. Fig. 2 is a view of the bolt and nut in elevation and with the nut and wedge and part of the bolt, adjacent the end, in section. Fig. 3 is a cross-section of Fig. 1, taken on the line $xx$ and through the nut and bolt. Fig. 4 is a view of the wedge in perspective.

Referring to the figures of the drawings, the letter A designates the bolt; B, the threads of the bolt; C, the nut; D, the threads of the nut; E, a slot or cut made in the nut at right angles to the length of the same and to a depth sufficient to allow the part of the nut designated by F to be bent outwardly.

G is a wedge of the general shape shown, and H is the tongue of the wedge, having a sharp edge. The wedge may be cut away at the ends, as at I I, so that openings will be left after the wedge is applied to the slot whereby the point of a tool can be inserted when it is desired to remove the wedge.

The methods of locking the nut in fixed position and releasing the same are obvious from the drawings. After the nut has been screwed upon the bolt and has reached the proper position the wedge is inserted within the slot and driven in with a hammer. The part of the nut F is sprung outwardly by this operation and its threads displaced relative to the threads of the bolt, so that the nut cannot turn. As the wedge advances the tongue H passes to a position between the threads of the bolt and still further locks the nut. The wedge, preferably made of steel, can be advanced far enough when desired to cause the point of the tongue to enter the metal of the bolt below the line of the threads, and thus more securely anchor the nut against any possible movement relative to the bolt. To release the nut, the point of any suitable tool is applied to the ends I I of the wedge and a few strokes of the hammer will remove the same from the slot. The part F of the nut is then hammered back into alinement and the nut can be removed.

From the foregoing description it will be seen that I have provided means for holding a nut in a fixed position upon a bolt and which is characterized by simplicity of construction, facility of manipulation, and certainty of operation, and which, moreover, does not weaken or impair the bolt or nut, so that the process of locking and releasing the nut can be repeated indefinitely.

What I claim as new, and desire to secure by Letters Patent, is—

1. The combination with a bolt, of a nut having a slot or cut in the body of the same, crosswise thereof, and substantially parallel with the threads of the bolt; and a wedge having an edge adapted when seated within the slot of the nut to engage the bolt and hold the nut in a fixed position relative to the bolt.

2. The combination with a threaded bolt, of a threaded nut having a slot; and a wedge cut away at the ends, as at I I, and provided with a sharp tongue; substantially as and for the purpose set forth.

3. The combination with a threaded bolt, of a threaded nut having a slot or cut, E; and a wedge G; the portion, F of the nut being adapted upon the insertion of the wedge in the slot to bend outwardly and displace the threads of the nut relative to the threads of the bolt, and the edge of the wedge adapted to engage the bolt.

In testimony whereof I affix my signature in presence of two witnesses.

SILAS COON.

Witnesses:
H. W. SHUTE,
H. M. WARE.